April 18, 1933.  E. J. VON PEIN  1,904,964
CASH REGISTER
Original Filed April 28, 1919   10 Sheets-Sheet 2

Inventor
EDWARD J. VON PEIN
Attorneys

April 18, 1933.  E. J. VON PEIN  1,904,964
CASH REGISTER
Original Filed April 28, 1919  10 Sheets-Sheet 3
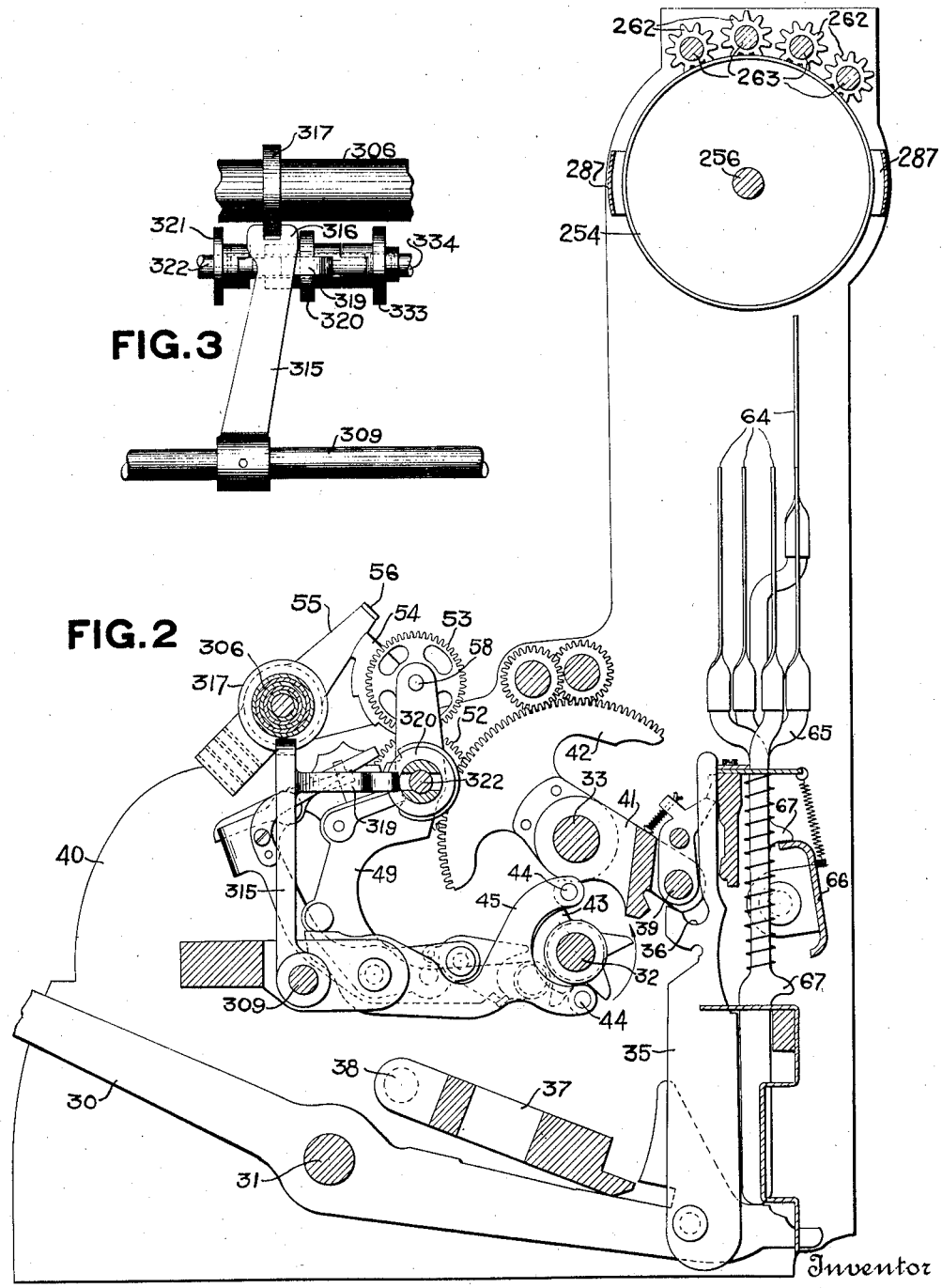
Inventor
EDWARD J. VON PEIN
Carl Beust
Henry E. Stauffer.
Attorneys April 18, 1933. E. J. VON PEIN 1,904,964
CASH REGISTER
Original Filed April 28, 1919 10 Sheets-Sheet 4
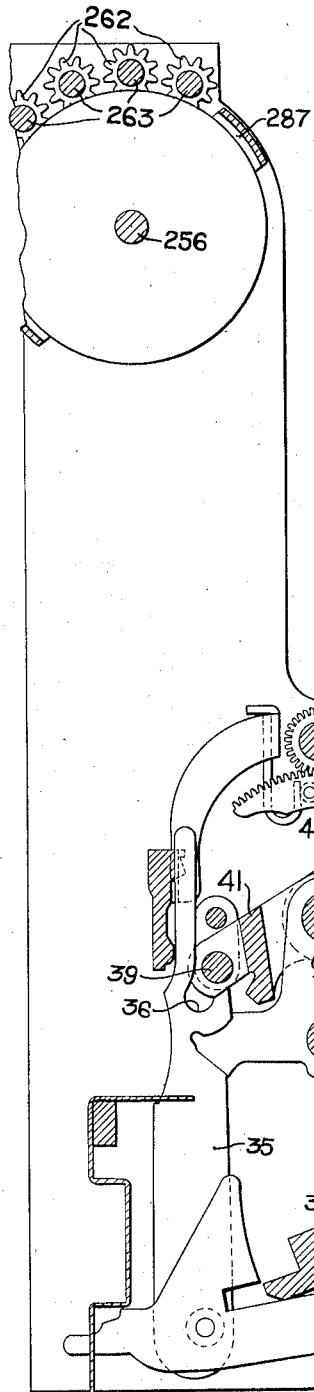
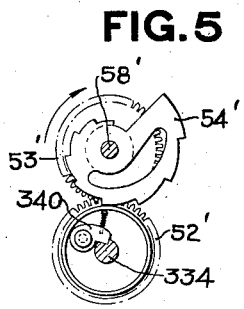
FIG. 5
FIG. 4
Inventor
EDWARD J. VON PEIN
Carl Beist
Henry E. Stauffer
Attorneys

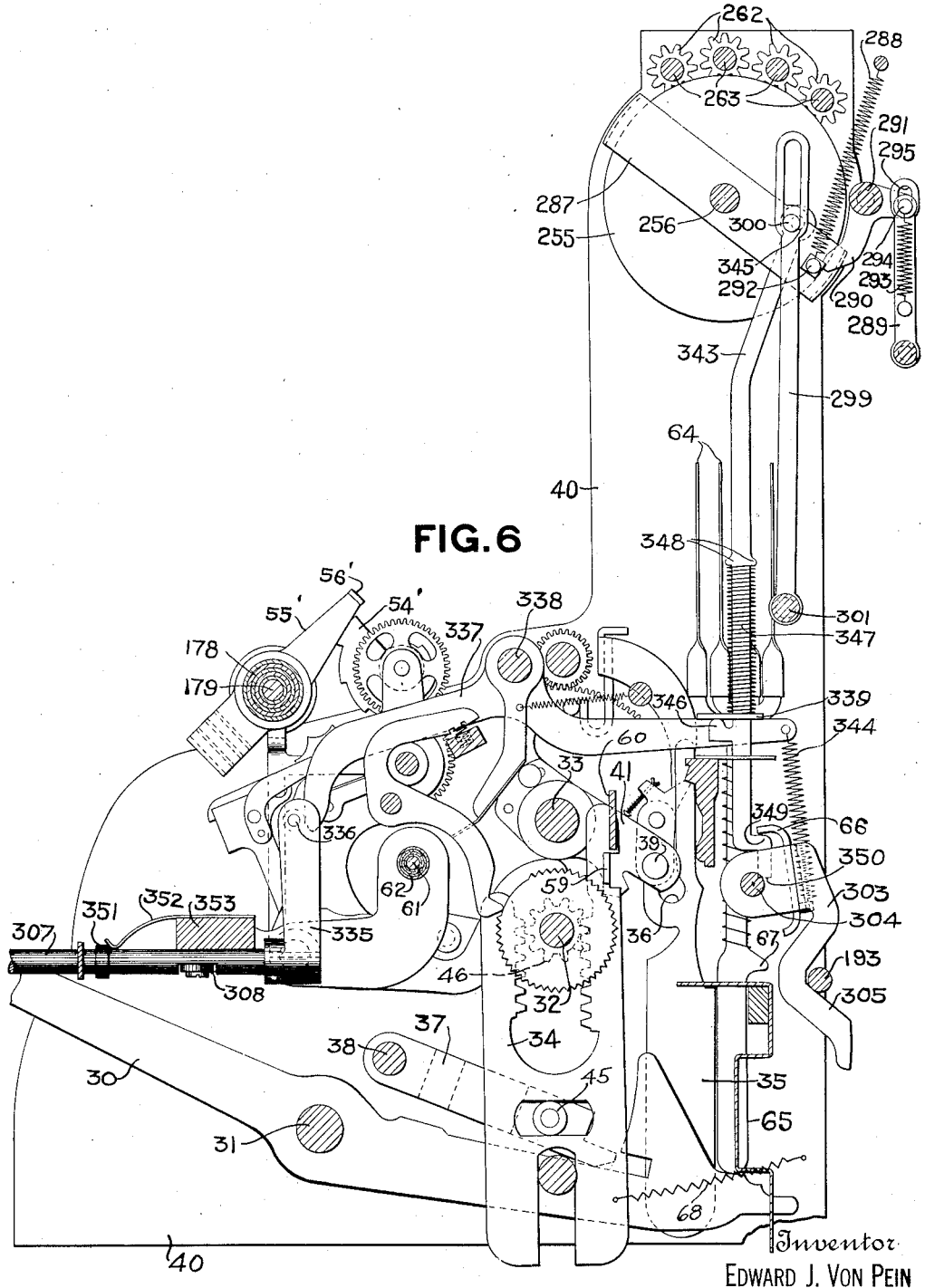

April 18, 1933.  E. J. VON PEIN  1,904,964
CASH REGISTER
Original Filed April 28, 1919  10 Sheets-Sheet 6
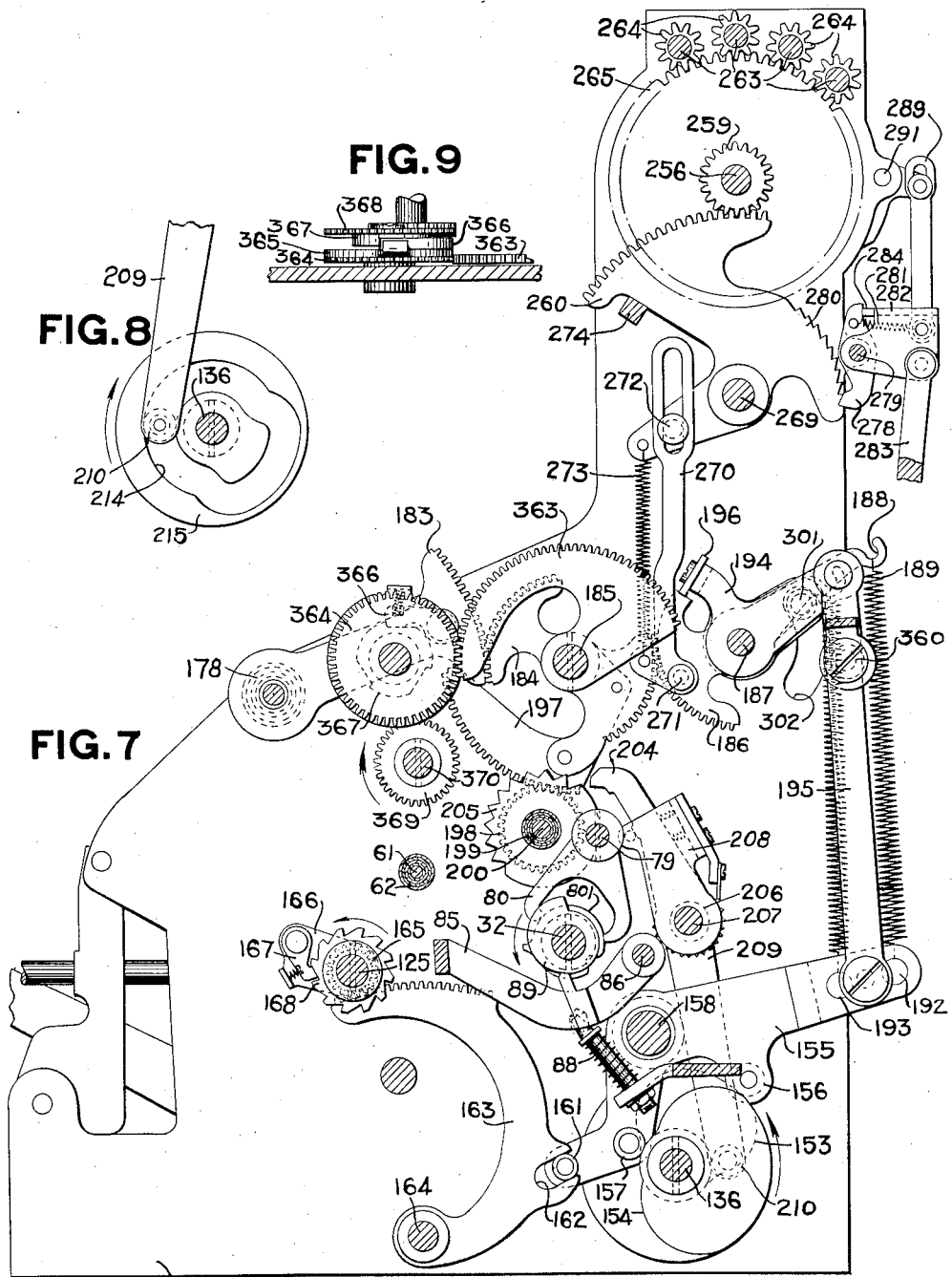

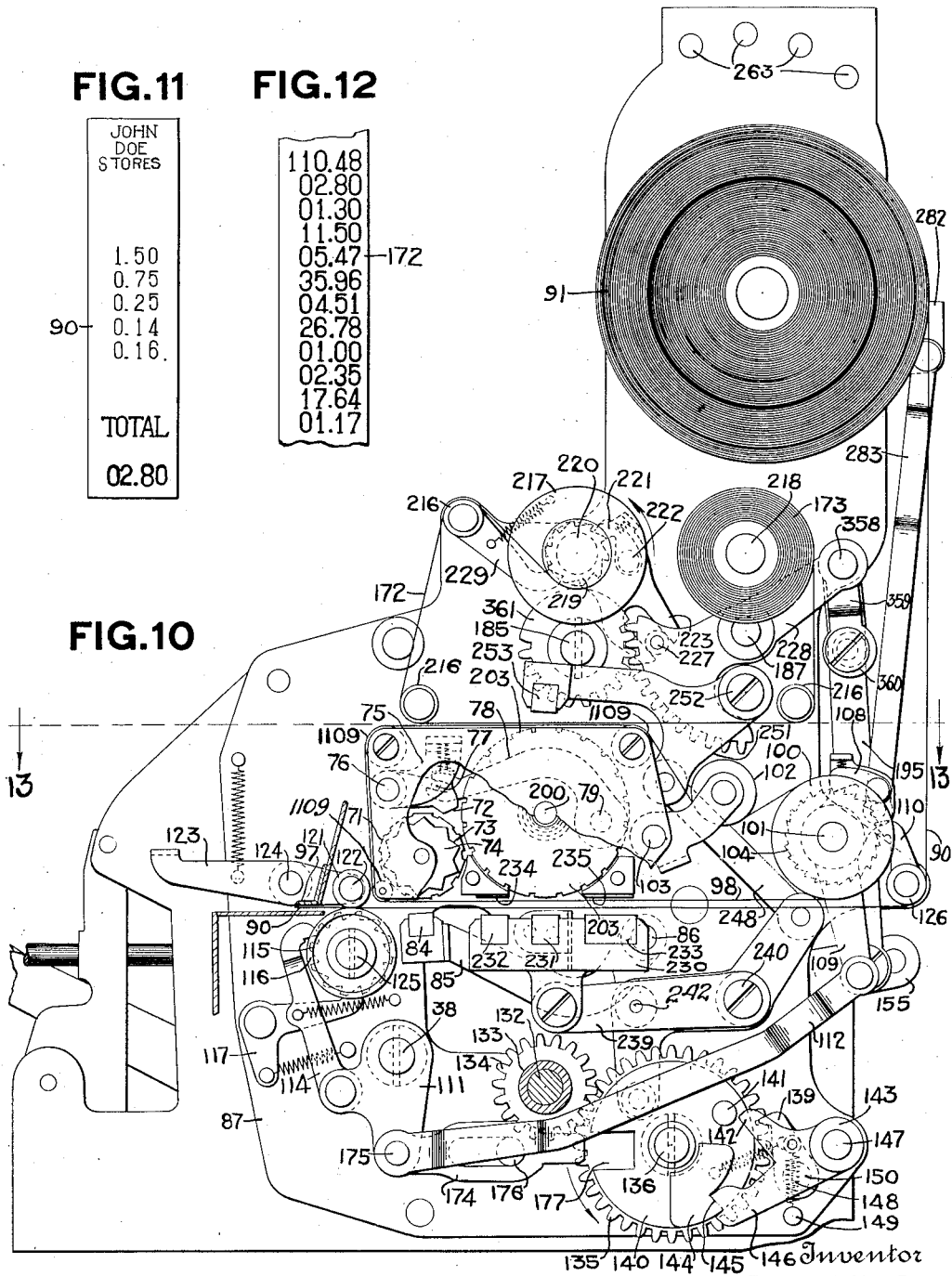

April 18, 1933.  E. J. VON PEIN  1,904,964
CASH REGISTER
Original Filed April 28, 1919   10 Sheets-Sheet 8

Inventor
EDWARD J. VON PEIN
Attorneys

April 18, 1933.   E. J. VON PEIN   1,904,964
CASH REGISTER
Original Filed April 28, 1919   10 Sheets-Sheet 9

Inventor
EDWARD J. VON PEIN

April 18, 1933.  E. J. VON PEIN  1,904,964
CASH REGISTER
Original Filed April 28, 1919   10 Sheets-Sheet 10
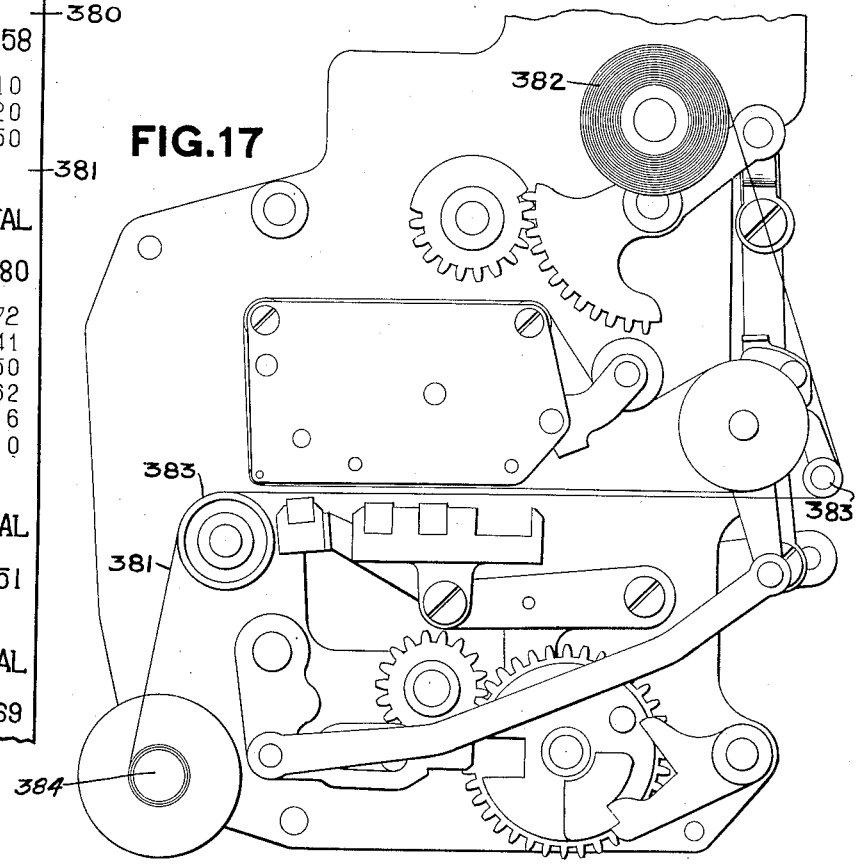

Patented Apr. 18, 1933

1,904,964

UNITED STATES PATENT OFFICE

EDWARD J. VON PEIN, OF DAYTON, OHIO, ASSIGNOR, BY MESNE ASSIGNMENTS, TO THE NATIONAL CASH REGISTER COMPANY, OF DAYTON, OHIO, A CORPORATION OF MARYLAND

CASH REGISTER

Application filed April 28, 1919, Serial No. 293,141. Renewed December 26, 1931.

This invention relates to accounting machines and more particularly to those which, in addition to making a record of transactions upon totalizers, make an additional printed record of all transactions and in particular accumulate totals and print and indicate them.

An object of this invention is to provide an accounting machine mechanism for the recording of individual items, a total of a plurality of such items, and any desirable reading matter, by printing or indicating upon an issuing strip, and simultaneously recording a similar total of a plurality of items upon a record strip retained in the machine.

Another object is to provide means whereby several transactions entered in the recording totalizer are added, a total displayed in the front and rear of the machine by indicators, and a total printed, and coincidently with the same operation, all amounts previously entered therein removed and the parts brought to zero positions.

A further object is to provide means whereby all transactions entered are added in the grand totalizer, a total printed, and a total displayed both in the front and rear of the machine by indicators, and coincidently with the same operation all amounts previously entered therein removed and the parts brought to zero positions.

A still further object is to provide means, in a modified form, whereby items and a total of items are printed or indicated upon an inserted slip, and simultaneously a total is printed upon a record strip retained in the machine.

A still further object is to provide means, in a modified form, whereby items and a total of items are printed or indicated upon a record strip.

With these and incidental objects in view the invention consists in certain novel features of construction and combinations of parts, the essential elements of which are set forth in the appended claims, and preferred forms or embodiments of which are hereinafter described with reference to the drawings which accompany and form part of the specification.

Of said drawings:

Figs. 1A and 1B taken together constitute a plan view of the type of machine shown in the Letters Patents to Cleal 718,565 and 773,060 granted January 13, 1903 and October 25, 1904 respectively, with this invention, which relates to improvements on the United States Letters Patent, No. 1,555,534, issued September 29, 1925 to E. J. Von Pein, applied thereto.

Fig. 2 is a transverse sectional view taken on the line 2—2 of Fig. 1A looking in the direction of the arrows.

Fig. 3 is a detail view of the "grand totalizer" resetting clutch.

Fig. 4 is a transverse sectional view taken on the line 4—4 of Fig. 1A looking in the direction of the arrows.

Fig. 5 is a detail view of the totalizer accumulators.

Fig. 6 is a transverse sectional view taken on the line 6—6 of Fig. 1B looking in the direction of the arrows.

Fig. 7 is a transverse sectional view taken on the line 7—7 of Fig. 1B looking in the direction of the arrows.

Fig. 8 is a detail view of the total type wheel aligning cam viewed from the left.

Fig. 9 is a detail view of the turn to zero clutch mechanism.

Fig. 10 is an elevation of the printing mechanism.

Fig. 11 is a detail view of the issuing strip.

Fig. 12 is a detail view of the record strip.

Fig. 17 is an elevation of a further modified form of printing mechanism.

Fig. 18 represents a record strip printed by the printing mechanism shown in Fig. 17.

Figure 1A:
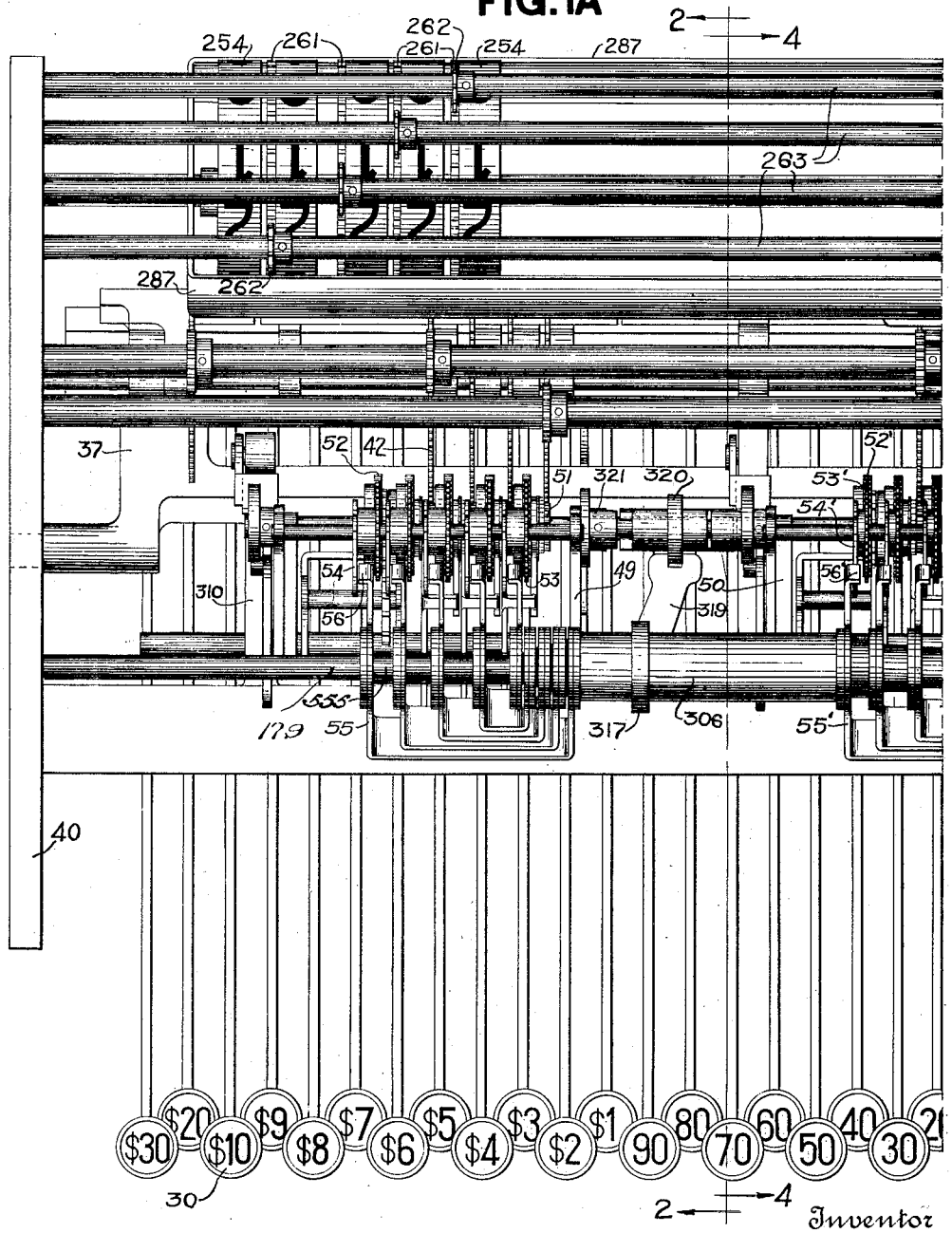

Described in general terms the machine includes a series of manipulative devices such as keys which operate mechanism for indicating the items and also entering the items on an issuing strip or other records as desired, and totalizers. These keys are arranged upon a rod and are similarly operated, each key imparting an individual characteristic movement to actuate devices which in turn actuate the elements of totalizers in accordance therewith and also set up type carriers which may have an impression taken therefrom upon an issuing strip.

The machine is provided with two totalizers, and for convenience the left hand totalizer will be referred to in the specification as the "grand totalizer" while the right hand totalizer will be known as the "recording totalizer".

When it is desired to take a total, for instance, on the strip handed to a customer the actuating devices are set in motion by a totalizing crank. Stepped scroll plates connected to the movable elements of the "recording" totalizer, control the setting of the total indicators and connections are made at the same time to make an impression on the record strip and issuing strip and to feed the strips. Suitable aligning devices are actuated by the keys and totalizing crank to align the type so as to properly record the items and the totals. After the record of the total is made upon the strips, suitable mechanism returns to zero position the elements and scroll plates of the "recording" totalizer.

To print a "grand" total for instance, on the record strip, a key on the extreme right of the machine is pressed whereby the elements which engage with the stepped scroll plates of the "recording" totalizer are shifted to a disengaged position and simultaneously a companion set of elements is moved into a position to engage with stepped scroll plates in the "grand" totalizer. The actuating devices are controlled in the same manner as when taking a total from the "recording" totalizer which has previously been described.

Referring specifically to the machine embodying the invention and at this time bearing in mind that all the action thereof is started by the keys prominent at the front of the machine, the transfer of motion from the keys to the other parts will now be set forth. The keys 30 (Fig. 6) are pivoted upon a transverse rod 31. When the forward ends of one or more of the keys 30 are depressed a key coupler 37 with trunnions 38 having bearings in side frames 40 is rocked. The oscillatory movement of the key coupler 37 reciprocates a double rack 34 to give a complete rotation to a main operating shaft 32 at each complete operation of a key 30. Counter-clockwise movement of the key coupler 37, by means of a stud 45 moves the rack 34 upward and the right hand teeth (Fig. 6) are in engagement with a pinion 46 fast on the shaft 32. When the key coupler 37 reaches the end of its counter-clockwise movement the lug 59 is at the top of lug 60 and a spring 68 rocks the rack 34 and disengages the right hand teeth from the pinion 46 and engages the left hand teeth with said pinion. As the key coupler 37 rocks clockwise to normal position the lug 59 comes down on the right side of lug 60 and when the lug 59 reaches the bottom of lug 60, the spring 68 rocks said rack to the position shown. This mechanism is substantially the same as that shown in the aforesaid Cleal Patent, No. 773,060. Attached to the rear end of each key 30 is an upright arm 35, said arms 35 being formed with graduated slots 36 adapted, when a key 30 is operated, to engage a transverse rod 39 carried by a rocking frame 41 pivoted on a transverse rod 33 to rock said frame different distances, according to the key 30 depressed. There are as many frames 41 as there are denominational groups of keys 30, in the present instance four. Each of the frames 41 has attached to it a registering segment 42 (Fig. 4).

Figure 1B:
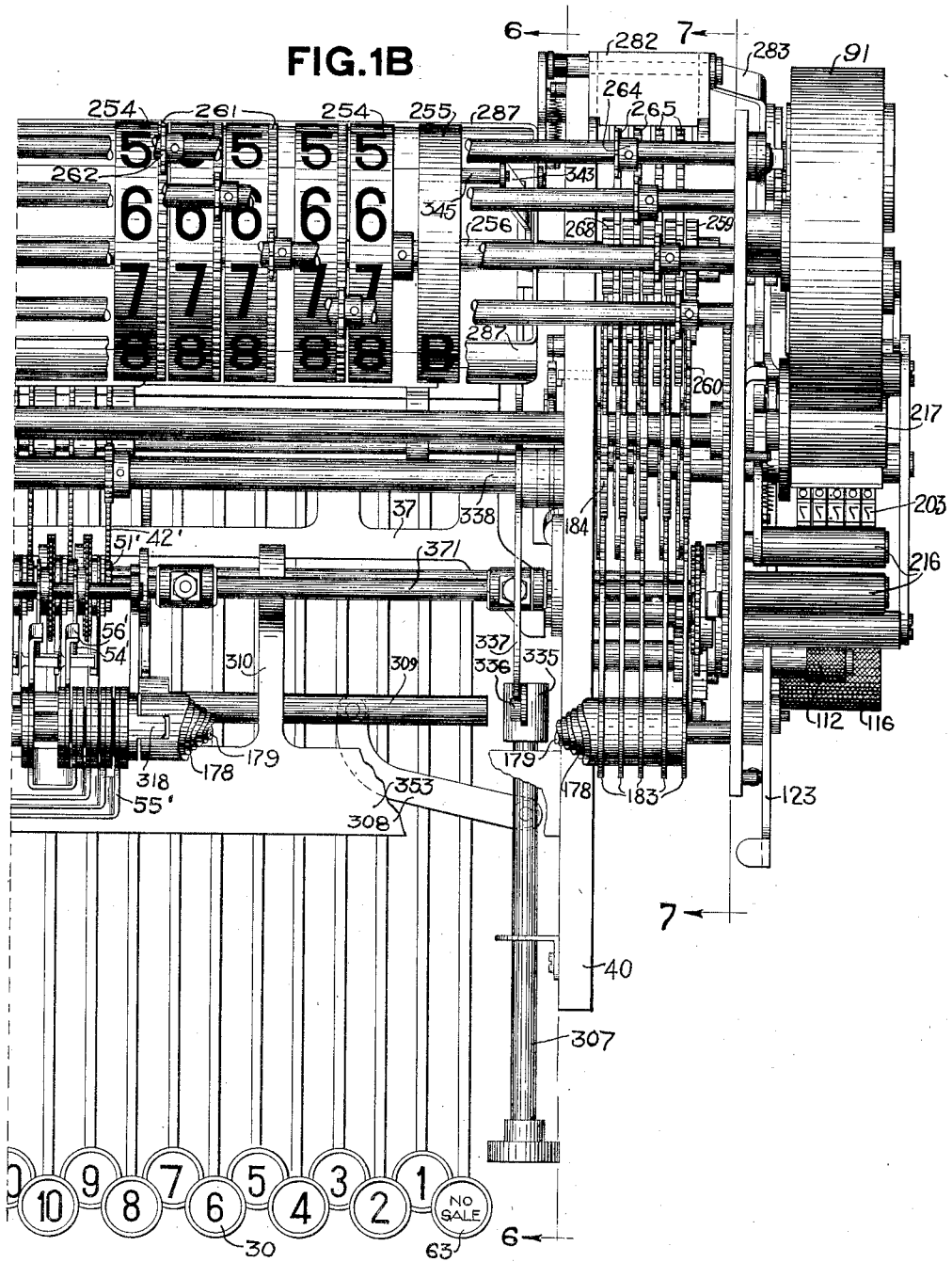

By referring to Figs. 1A and 1B, it will be noted that there are eight registering segments four segments 42 are allotted to the left hand or the "grand" totalizer, and the remaining four segments 42' are allotted to the right hand or "recording" totalizer. The corresponding ones of the two sets of registering segments 42 and 42' are coupled together to operate simultaneously in the manner fully set forth in the aforesaid Cleal Patents, Nos. 718,565 and 773,060.

When the keys 30 are variously operated, the registering segments 42 and 42' are moved different distances to operate the two totalizers which are rocked into position to be actuated by the registering segments, by means of engaging devices, at the appropriate time during the operation of the machine. These engaging devices are the same for each totalizer and are shown in Fig. 2. They comprise cams 43 mounted on the main operating shaft 32 and adapted to act upon rolls 44 carried by the rearward arms of engaging levers 45, fast to rocking frames 49 and 50 carrying the two totalizers.

It is sufficient here to state that when the cams 43 act upon the engaging levers 45 the totalizer frames 49 and 50 will rock about their pivots so as to engage the totalizers carried thereby with the two sets of registering segments 42 and 42'.

The two totalizers are of the usual form, fully described in the aforesaid patent to Cleal, and it is sufficient to state here that each comprises a plurality of rotatable elements, each appropriate to a numerical order. Each totalizer in the form herein shown; includes five of these rotatable elements, the four of lower numerical order of each totalizer being each provided with a small pinion (51 for the "grand" totalizer and 51′ for the "recording" totalizer) (Figs. 1A and 1B) which, when the totalizer frames are rocked to engage the totalizers with the registering segments 42 or 42′, will mesh with the registering segments so that the rocking movements of the registering segments will be transmitted to the elements of the engaged totalizer. The one additional element of each totalizer is for the purpose of giving a higher registering capacity to the totalizers, and is adapted to receive the overflow of transfer movements from the wheels of lower order. Any number of such overflow wheels may be employed to increase the registering capacity of the totalizers. Any suitable form of transfer mechanism may be employed but it is preferred to employ the form shown in the present application. As this form constitutes no part of the present invention and is fully set forth in the aforesaid Cleal patents it will not be described here. The "grand" totalizer and the "recording" totalizer are not provided with numerals on the peripheries of the elements to permit the reading as in the aforesaid Cleal patents but each element of the totalizers is rigidly connected with larger pinions 52 and 52′ (Figs. 1A, 2, 4 and 5) which mesh with the pinions 53 and 53′ rotatable on shafts 58 and 58′ mounted in brackets carried by the rocking totalizer frames 49 and 50. Each of the pinions 53 and 53′ has rigidly connected thereto a stepped scroll plate 54 and 54′, respectively. By reason of the gear connections just described any movement of the totalizer elements will be transmitted directly to the stepped scroll plates 54 and 54′ so that said plates are caused to rotate to positions appropriate to the total of the items entered on the totalizers. Instead of indicating the totals on the totalizers by the usual indication on the circumference of the totalizer wheels, yoked arms 55 and 55′ having formed lips 56 and 56′ thereon may be brought into contact with the scroll plates 54 and 54′ at varying radial distances from the center thereof to transmit to printing mechanism the amount accumulated on the totalizer as will be later described.

Each of the segments 42′ for the right hand or "recording" totalizer also meshes with a pinion 57 (Fig. 4). The pinion 57 which meshes with a registering segment 42′ of the highest order of the set just above mentioned is fast on the left hand end of the shaft 61 while the other three pinions 57 are each fast to the left hand end of one of a set of nested or telescopic sleeves 62 (Figs. 6 and 7). The sleeves 62 and the shaft 61 extend to the right and on their right hand ends carrying printing wheels 71 (Fig. 10) for printing the detailed transactions on the issuing strip in a manner hereinafter described.

In the operating mechanism is a special or "no sale" key 63 (Fig. 1B) which has no connection with the totalizers and simply opens the cash drawer, indicating the character of the transaction and recording ciphers on the issuing strip, both operations being well known in the art.

The items entered on the totalizers and on the issuing strip by the operation of the keys will be shown to the purchaser by a series of indicators 64 (Fig. 2) which are carried on the upper ends of vertical rods 65, the lower ends of said rods being supported by the rear ends of the keys. Each indicator 64 bears on each of its faces a figure or legend appropriate to the key to which the indicator is allotted. An oscillating bail 66 is rocked beneath the projections 67 extending from the rods 65 and supports said rods and indicators in elevated positions so as to indicate the item recorded on the totalizers and issuing strip.

In order to align the type carriers 71 (Fig. 10) spring pressed pawls 72 are moved into contact with aligning notches 73 formed on the periphery of disks 74 fast on and moving with the type carriers 71. The spring pressed pawls 72 are carried in the frame 75 pivoted on a rod 76 which is mounted in the printer frame. The frame 75 carries a pin 77 projecting into the forward bifurcated end of an arm 78 fast on the shaft 79. A forked arm 80 (Fig. 7) contacts a cam 801 on the driving shaft 32 and thus by timed action of arm 80 by said cam, the shaft 79 will throw the spring pressed pawls 72 into the notches 73, the tension of the springs being such as to quickly move the pawls with sufficient force into the notches so as to secure alignment of the type carriers 71.

Simultaneously with the engagement of the aligning pawls 72 in the notches 73 of the disks 74 a platen 84 will be released to take an impression from the adjusted type carriers 71. This platen 84 is mounted in the forward end of an arm 85 (Figs. 7 and 10) pivoted upon a stud 86 mounted in the printer frame 87, which is an adjunct to the main frame of the machine, and carries the printer mechanism. This arm 85 is held by a spring actuated plunger 88 is contact with a cam 89 (Fig. 7) secured to the driving shaft 32. The form of this cam 89 is such that by a half rotation of the shaft 32 the cam will rock the arm 85 about the stud 86 against the action of the spring actuated plunger 88 and as the higher point of the cam 89 passes the point of contact with lever 85 said lever will be released to permit the spring actuated plunger 88 to carry the platen 84 into contact with the aligned type of the item type carriers 71.

The printing from the foregoing type mechanism is made upon an issuing strip 90 (Figs. 10 and 11) which is run from a supply roll 91 around a guide roll 126 to a severing plate 97, said plate being mounted on the printer hood of the cabinet. This record strip in passing from the supply roll to the severing plate passes between the type carriers 71 and the platen 84 so that when the platen is operated, as previously described, an impression will be made on said strip.

To secure a visible impression a suitable continuous inking ribbon 98 is wound around guide rolls 1109 mounted in the printer frame and over an inking roller 100 mounted upon a stud 101 projecting from the printer plate. This ribbon 98 is held taut by a tension roll 102 supported in a frame mounted upon a rod 103 pivoted in the printer frame. The ribbon is fed at each operation of the recording keys 30 to bring a new inking surface between the platen and the type. The feeding of the inking ribbon is effected by an oscillatory movement of a lever 109 pivoted on the ink roll stud 101 and carrying a spring pressed pawl 108 which engages a ratchet wheel 104 fast to the ink roll 100. The oscillatory motion of the lever 109 is furnished by the key coupler 37 as will later be described. A retaining pawl 110 engages the ratchet wheel 104 for the purpose of preventing a retrograde movement of the same.

For feeding the issuing strip 90 there is provided a feed roller 116 (Fig. 10) mounted on a shaft 125, journalled in the printer frame 87, and having fast thereto a ratchet wheel 115 which is engaged by a spring pressed pawl 114 pivoted on an arm 111, said arm being fast to the trunnions 38 upon which the key coupler oscillates.

At each operation of a key 30, which imparts an oscillatory motion to the key coupler 37, the pawl 114 being engaged with the ratchet wheel 115 will cause the feed roller 116 to rotate in a counter-clockwise direction. To prevent a retrograde motion of roller 116 a spring pressed retaining pawl 117, mounted on the printer frame 87, engages the ratchet wheel 115. Directly above the feed roller 116 and in contact with the same in a tension roller 121 freely mounted on a stud 122 carried by a spring controlled lever 123 pivoted on a stud 124 mounted in the printer frame 87. The issuing strip 90 passing between the feed roller 111 and the tension roller 121 will feed toward the front of the machine a distance equal to one division of the ratchet wheel at each operation of a key 30.

Arm 111 which oscillates with the key coupler is connected by a link 112 to the ribbon feeding lever 109 which it will be recalled is for conveying feeding motion to the ink roller 100 previously described.

Figure 13:
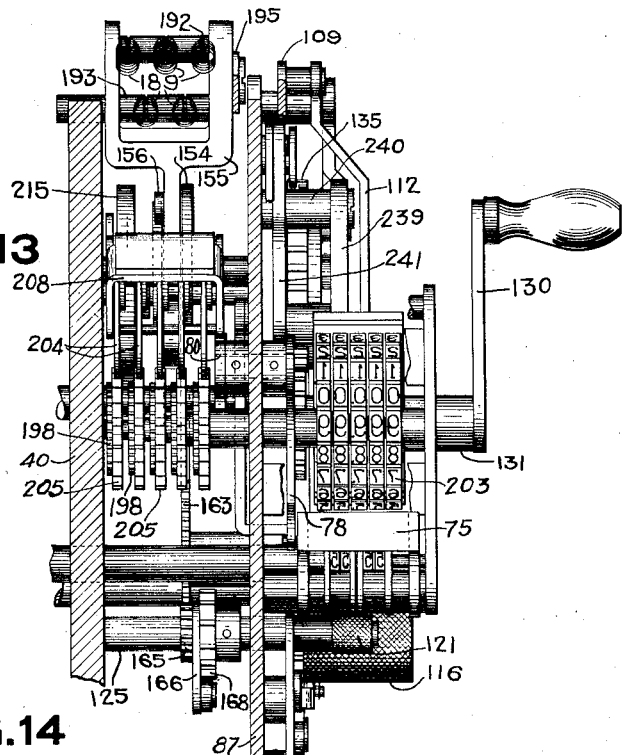
Fig. 13 is a horizontal sectional view of the printer with parts removed for clearness, taken on the line 13—13 of Fig. 10 looking in the direction of the arrows.

The total printing crank 130 (Fig. 13) which primarily serves as an actuator in connection with the printing and indicating of the total, is mounted upon a sleeve 131 surrounding the stud 132 (Fig. 10) supported in the frame 87, and is adapted to be given two rotations in a clockwise direction at each operation. The sleeve 131 is operatively connected with a companion sleeve 133 (Fig. 10) which is attached to gear 134. The gear 134 meshes with a gear 135 fastened on a driving shaft 136. As gear 134 has half as many teeth as gear 135 it is necessary for the total printing crank to make two complete turns in its operation to rotate the shaft 136 one complete turn.

Pivoted on a stud 150 mounted in the frame 87 (Fig. 10) is a spring controlled pawl 139, the action of which is to maintain its point between the teeth of gear 135 so that shaft 136 can rotate only in a counter-clockwise direction. Securely fastened to the gear 135 is a disk 140 carrying a projecting pin 141 which is adapted to engage a branch 142 of an arm 143. Also fastened to gear 135 is a plate 144 having a shoulder 145 which engages the end 146 of the arm 143 which is pivoted upon a stud 147 mounted in the frame 87. Attached to arm 143 is a spring 148 which, when the end 146 of the arm 143 is released from the shoulder 145 of the plate 144 by a slight clockwise rotation of shaft 136 will swing the arm 143 downwardly until it contacts a pin 149. The end 146 of the arm 143 being disengaged from the plate 144 the crank 130 can now be rotated to perform its previously described functions. Toward the end of the rotation of shaft 136 the pin 141 mounted in the disk 140 comes into contact with the branch 142 of the arm 143 and raises the arm to a position so that the end 146 will be in the path of the shoulder 145 of the plate 144 to stop the shaft 136 at the completion of its cycle.

Fast upon shaft 136 are two open cams 153 and 154 (Fig. 7) which impart an oscillatory motion to a lever 155 by being in contact with anti-friction rollers 156 and 157 respectively. Said rollers are carried on studs mounted in the lever 155 which is pivoted upon the shaft 158. Carried in the lower end of the lever 155 is an anti-friction roller 161 engaging a slot 162 in a segment arm 163 pivoted upon a stud 164 mounted in the machine frame 40 and meshing with a pinion 165 fast to an arm 166 freely mounted upon the shaft 125. The arm 166 carries a spring pressed pawl 167 engaging a ratchet wheel 168 which is fast to shaft 125 to which is attached the issuing strip feed roller 116, previously described. The mechanism just described is for rotating the feed roller 116 each time a total is recorded by the total printing and indicating crank, to feed the issuing strip a distance sufficient to bring the total printing past the severing means.

To prevent a simultaneous manipulation of the operating handle 130 and the keys 30, a device is provided which will lock either operative element while the other is being manipulated. To accomplish this a slidable bar 174 (Fig. 10) is provided and is pivoted upon a stud 175 mounted in the arm 111, which is operated by the key coupler as previously described. The bar 174 is slotted to slide on a guide stud 176 mounted in the printer frame 87. The end of said bar 174 is shaped to enter a slot 177 in the disk 140 fastened to the gear 135. By the foregoing description and the drawings it can be seen that during the operation of the keys 30 the totalizing crank 130 cannot be operated and if the crank is rotating the keys 30 will be locked against operation.

The nested sleeves 62 and connections for operating the printing type carriers 71 have already been described and the printing connections associated with the sleeves 178 will now be explained, referring first to the connections to the "recording" or right-hand totalizer. The sleeves 178 (Figs. 1B and 6) are suitably supported in the framework of the machine. At their left hand ends the sleeves 178 surrounding the shaft 179 have each clutched thereto a yoked arm 55'. Each of the yoked arms is located adjacent one of the stepped scroll plates and has a formed lip 56' adapted to be brought into contact, in a manner hereinafter described, with the steps of the plates 54' which have been brought into effective position. At their right hand ends the sleeves 178 carry rack segments 183 (Figs. 1B and 7), which mesh with mutilated gears 184 mounted to turn on a shaft 185. At the rear the mutilated gears 184 engage segment gears 186 mounted to turn on a shaft 187. The gears 186 (Fig. 7) have hooks 188 to which are connected springs 189 also connected with grooved rods 192 and 193 extending within two arms on the oscillating lever 155, which has previously been described.

As the lever 155 is rocked in a clockwise direction (Fig. 7) this movement will be transmitted to a yoke arm 194, pivoted on the shaft 187, through the medium of a link 195. As the arm 194 is moved in a clockwise direction a bar 196 fastened thereon will tend to be withdrawn from contact with the segments 186. The segments 186 are however held in contact with the plate 196, by the springs 189 which are further tensioned by the clockwise movement of the lever 155, and the segments 186 will travel after the bar 196. Through the connections including the mutilated gear 184 and rack segments 183, the sleeves 178 will be rocked in a clockwise direction (Fig. 6) when the segments 186 are rocked as just above described. This rocking of the sleeves 178 in a clockwise direction will carry the yoked arms 55' in a similar direction until each of the formed lips 56', carried by the arms 55', is brought into contact with the positioned step of its appropriate stepped scroll plate 54', thus arresting further movement of the yoked arms 55' and consequently arresting further movement of the mechanism just above described.

The mutilated gears 184 (Fig. 7) are provided with downwardly extending arms carrying segmental racks 197 which mesh with pinions 198 carried by the left hand ends of nested sleeves 199 carried by a shaft 200. These sleeves 199 carry on their right hand ends type wheels 203 (Fig. 10) for printing a total. It will thus be seen from the above described connections that as the gears 184 are moved by the action of segments 186, which movements are arrested by contacts of the yoked arms 55' with stepped scroll plates 54', the type wheels 203 will be moved to a position representing the adjustment of the stepped scroll plates 54' which adjustment is appropriate to the total of the items which have been entered on the "recording" totalizer.

After an impression is taken from the type wheels 203, in a manner hereinafter described, the lever 155 (Fig. 7) is rocked in a counter-clockwise direction which movement will be transmitted to the arm 194 through the medium of the link 195 and thus restore all of the segments 186 to normal positions shown in Fig. 7. This restoration of the segments 186 will likewise effect the restoration of the gears and segments 184 and 183 and sleeves 178 thus rocking the yoked arm 55' out of contact with the stepped scroll disks 54'. This movement at the same time is transmitted through the segments 197 to the total printing wheels 203, thereby restoring said total printing wheels to normal zero position.

Means for aligning each of the type wheels 203 is provided by timing the engagement of pawls 204 with notched disks 205, each disk being fast to a gear 198. These said notched disks are provided to align the total type wheels 203 at the time of printing a total on the issuing strip and total record strip. The pawls 204 are mounted upon adjustable eccentric hubs 206 on a rod 207 carried in the framework of the machine. Fulcrumed on rod 207 is a frame 208 which supports the pawls 204 to control their engagement with the notched disks 205 (Fig. 7). Extending downward and being a part of frame 208 is an arm 209 carrying an anti-friction roller 210 which cooperates with a cam race 214 in a disk 215 (Figs. 7 and 8).

Said disk 215 is mounted on shaft 136 which is rotated in a counter-clockwise direction (as viewed in Fig. 7, and clockwise as viewed in Fig. 8), each time the total printing crank 130 is operated, thereby conveying motion to the aligning pawls 204, all of which is well known in the art.

Having described the item printing mechanism and also the inking ribbon and its feeding mechanism which is operated by the item keys 30 it is now in order to describe the total printing mechanism which is operated by the totalizing crank 130.

Referring to the printing wheels 203 (Fig. 10) it will be seen that they are twice the diameter of the item printing wheels 71 and contain two sets of type characters, one set for printing upon the issuing strip 90 and the other for printing upon the total record strip 172. The characters upon said wheels 203 are of larger type so as to distinguish the printing of same from that of the item printing characters.

The total record strip 172 which contains a record of totals accumulated on both the "recording" totalizer and the "grand" totalizer is fed from a supply roll 173 which is freely mounted upon a stud 218 projecting from the printer frame 87, around guide rollers 216 and onto a receiving roll 217 which is freely mounted upon a stud 220 projecting from the printer frame 87. Fastened to the receiving roll 217 is a ratchet wheel 219 which is rotated in a counter-clockwise direction by a spring pressed pawl 221 pivoted upon a stud 222 mounted in an oscillating arm 223 which pivots upon the stud 220. Said arm 223 is bifurcated to engage a pin 227 carried in a rack segment lever 228 the actuation of which occurs each time the totalizing crank is operated as will hereinafter be described. To prevent retrograde motion of the receiving roll 217 a spring controlled pawl 229 pivoted upon the stud 216 engages the ratchet wheel 219.

At the time of the alignment of the total type printing wheels 203 (Fig. 10) by the operation of the totalizing crank a platen carrying block 230 will be raised bringing a platen 231 into contact with the type wheels 203. Another platen 232 will come in contact with a type plate 234 rigidly mounted on the frame 87 and containing the word "Total" and a third platen 233 will come into contact with another type plate 235 rigid on the frame 87 and containing a name of a business such as in Fig. 11 "John Doe stores". The action of these platens will cause an impression to be made upon the issuing strip 90, as shown in Fig. 11.

Figure 14:
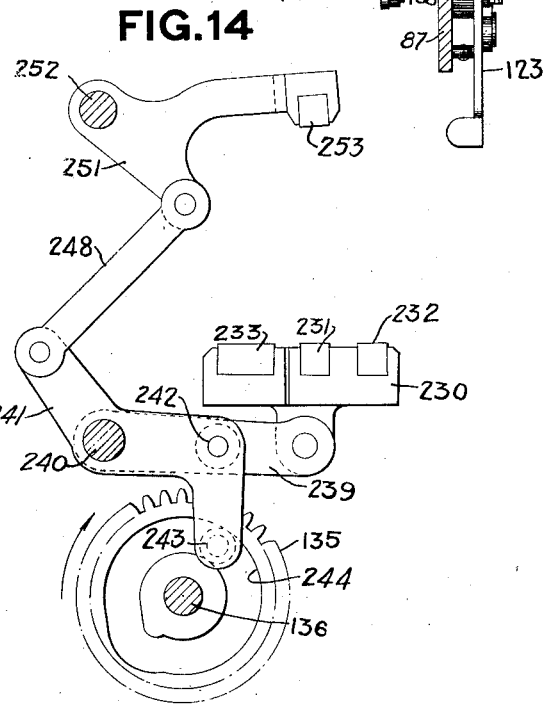
Fig. 14 is a detail view of the total printing arms and operating cam viewed from the left.

The platen bearing block 230 (Figs. 10 and 14) is pivotally mounted upon an arm 239, said arm being pivoted upon a stud 240 which projects from the printer frame 87. Pivoted on said stud 240 and tied to arm 239 by a rod 242 (Fig. 14) is a lever 241 which carries in its lower end an anti-friction roller 243 engaging a cam groove 244 in the gear 135, said gear being fast on shaft 136.

Simultaneously with the making of an impression upon the issuing strip a platen 253 (Figs. 10 and 14) will come into contact with the type on the top of the total printing wheel 203 to cause an impression to be made from the same upon the total strip 172. Said platen is carried by a bell crank 251 pivoted on a stud 252 projecting from the printer frame 87. Connecting arm 251 with the lever 241 for the purpose of imparting motion to said bell crank 251 is a link 248.

When printing and indicating a total from the "recording" totalizer it is essential to return, to zero positions, the totalizer elements including the stepped scroll plates 54' of the totalizer, thus leaving it, at the end of the totalizing operation, clear of all items and ready for the accumulation of another group of items.

Pivoted upon the stud 187 projecting from the printer frame 87 (Fig. 10) is a segment lever 288 which is connected at the rear end by a stud 358 and a link 359 to an adjustable eccentric stud 360 mounted in the link 195 connected to the oscillating lever 155 which is rocked each time the totalizing crank is operated.

Said segment lever 228, being connected to the oscillating lever 155, will rock first in a clockwise direction and then in a counter-clockwise direction at each totalizing operation, and, being in mesh with a partial gear 361 fast on a shaft 185 will impart a rocking motion to said shaft.

Fast on shaft 185 and inside the printer frame 87 (Figs. 7 and 9) is a segment gear 363 which meshes with a gear 364. Secured to gear 364 is a disk 365 carrying a spring pressed pawl 366 engaging a ratchet 367 which is fastened to a gear 368 in mesh with a pinion 369 fast on a shaft 370 which rotates in a clockwise direction. Coupling the shaft 370 (Fig. 7) with the recording totalizer shaft 334 (Figs. 4 and 5) is a shaft 371 (Fig. 1B) connected by universal joints at its ends to the shafts 334 and 370 to permit of a rocking motion to the totalizer frames. A more detailed description of the above mechanism is given in the United States Letters Patent, No. 1,555,534 issued on September 29, 1925, to E. J. Von Pein.

The rotation of the shaft 371 (Fig. 1B), for returning to normal zero positions the accumulator members of either of the totalizers, is timed to occur after the printing upon the issuing strip and the record strip during the operation of the total printing crank. The crank 130 (Fig. 13), by mechanism previously described, will impart a rocking motion to the gear train actuating the pawl 366 (Fig. 7) and cause said pawl to back up a distance of two notches in the ratchet 367 and then on its movement forward will rotate the gear 368 two-thirds of a rotation and in turn the gear 369 one complete rotation. The totalizer elements 52 (Fig. 5) carry a spring pressed pawl 340 engaging a groove in the shaft 334, which mechanism is well known in the art, and will, by the rotation of said shaft 334, return all elements in the "recording" totalizer to their normal zero positions.

In connection with printing the totals upon a receipt and upon a permanent record strip, two groups of cylindrical indicators are provided for displaying the totals, when recording the same, the left hand group for indicating to the rear and the right hand group indicating to the front of the machine and above the item indicators. Each of the groups in this particular case consists of five digit wheels 254 (Figs. 1A and 1B) which correspond to the five scroll stepped plates 54 and 54' in each of the totalizers. Adjacent the right hand group is a character or symbol wheel 255 which displays both to the front and rear to denote which totalizer the record and indication is taken from.

Four of the digit wheels 254 of each group and the symbol wheel 255 are loosely mounted upon a shaft 256. The fifth or units wheel of each group 254 is fast to the shaft 256 which is the driving shaft for these two wheels and has fast on the right hand end thereof a gear 259 (Figs. 1B and 7) which meshes with an actuating segment 260 which will hereinafter be described.

Each of the other four wheels 254 of both groups has fast thereon a large gear 261 (Figs. 1A and 1B). These gears 261 mesh with pinions 262 fast upon driving shafts 263 journalled in the side frames of the machine. Each of the shafts 263 has fast upon its right hand end a pinion 264 (Figs. 1B and 7) which meshes with a large driving gear 265. Each driving gear 265 and its companion gear 268 (Fig. 1B), which is identical with the gear 259 shown in Fig. 7, are fast together and freely mounted upon the shaft 256. The gears 268 also mesh with similar segments 260.

The last transaction recorded by the item keys 30 will be displayed by the tablet indicators 64 (Fig. 2) at the time of recording and indicating a total, and as it is not desirable to display two indications at the same time it is necessary to return to their home positions the tablet indicators 64 when displaying a total indication by the cylindrical indicators 254. To accomplish this an arm 303 (Fig. 6) is fastened to the oscillating bail 66 pivoted upon studs 304 which are mounted in the frame 40 of the machine. Engaging this arm 303 for rocking the bail 66 to release the tablet indicators 64 (Fig. 2) which have been elevated to a "display" position by the item keys 30, is the rod 193 (Figs. 6 and 7) carried in the oscillating lever 155 which when rocking in a clockwise direction will rock the arm 303 by its contact with the surface 305.

For the purpose of actuating the driving gears and through the described connections the total indicators 254, actuating segments 260 (Figs. 1B and 7), which are constantly in mesh with the smaller driving gears 259 and 268, are freely mounted upon a shaft 269 supported by the side frames of the machine. Referring to the stepped scroll plates 54 and 54' in the totalizers and the yoked arms 55 and 55' (Fig. 6) and their connections to the segments 186 (Fig. 7) it can be seen that during the operation of the totalizing crank 130 when the segments 186 rotate in a clockwise direction they will impart a similar motion to the segments 260 through links 270 which are pivoted upon studs 271 in the segments 186 and guided by studs 272 in the segments 260. The upper end of each link 270 has an elongated opening which is to permit the return of its companion segment 186 to its normal or home position, as described, and leave the total indicators in their set positions until an operation of an item key 30.

The indicators are held in adjusted position by retaining pawls 278 (Fig. 7) pivotally mounted on a rod 279 supported by the frame members of the machine and held in engagement with ratchet tooth portions 280 of the segment members 260 by springs 281.

For the purpose of eliminating the last total indication when the first item of a new transaction is recorded by the keys 30, there is provided a yoked frame 282 which oscillates upon the rod 279 each time any of the keys 30 are operated. Said frame 282 is connected to the inking ribbon feed lever 109 (Fig. 10) by a link 283 (Fig. 7) thus a rocking motion is given the frame 282. As the horizontal lip 284 of the said frame contacts the upper end of the retaining pawls 278 they are rocked on their pivot 279 and disengaged from the segments 260, and said indicators 254 are thus released and brought to home or zero positions, by the springs 273, into contact with the transverse bar 274.

Simultaneously with the releasing of the total indicators and their return to a home or zero position a flash 287 (Figs. 1A, 1B and 6) is released from a non-visible position and actuated by a spring 288, is brought into a normal horizontal or concealing position, as shown in Fig. 2, in which position it is behind the reading opening in the cabinet (not shown) of the machine and obscures from view the characters upon the total indicators.

The releasing of said flash 287 (Figs. 6 and 7) is accomplished by a link 289 connecting the oscillating yoked frame 282 with a pawl 290 which pivots upon a stud 291. The lower end of said pawl 290 is notched to latch over a pin 292 mounted in one end of the flash 287. A spring 293 (Fig. 6), one end of which is attached to the link 289 and the other end to the pawl 290, holds the pin 294, which is mounted in the pawl 290, in the bottom of a slot 295. This slot permits the pawl 290 to rock in a counter-clockwise direction when the flash 287 is returned to its latched or exposing position, as shown in Fig. 6, by the pin 292 passing over the notched end of the pawl.

The flash 287 is brought into the normal concealing position by the spring 288 and moved to its exposing position by a link 299, the upper end of which has an elongated opening engaging a pin 300 fastened in the flash. The lower end of the link 299 is pivoted upon a stud 301 carried in the yoked arm 194 (Fig. 7). Said stud 301 extends through an opening 302 in the side frame 40 to connect with the link 299. The rocking motion of the yoked arm 194, which has previously been described, is conveyed by the link 299 to the flash 287. This motion coming from the totalizing crank through its connecting mechanism to the flash, will uncover the characters upon the total indicators 254 at the proper time when recording a total from any of the totalizers and thereby indicating the total taken from the totalizer.

Having fully described the mechanism for recording and indicating totals from the "recording" totalizer it is now in order to describe the recording and indicating of totals from the "grand" totalizer.

Referring to Figs. 1A and 1B, the yoked arms 55' have attached to the left arm of the yoke a companion set of nested sleeves 306 which extend to the left and have fast on their left hand ends a companion group of yoked arms which are adapted to engage with the stepped scroll plates 54 of the "grand" totalizer when taking a total from the same. These yokes are held in fixed spaced relation by sleeves 555 on the rod 179, as shown in Fig. 1A.

Normally said yoked arms 55 of the "grand" totalizer with their formed lips 56 are not in a position to engage with the stepped scroll plates 54 of the "grand" totalizer for in the so called normal position, the yoked arms 55' of the "recording" totalizer are in a position to engage the stepped scroll plates 54' thereof. So in taking a record from the "grand" totalizer it becomes necessary to shift the yoked arms 55 and 55' of both totalizers a slight distance to the left and in so doing the yoked arms 55 on the left are positioned to engage with the stepped scroll plates 54 of the "grand" totalizer and their companion set 55' on the right are shifted to a disengaged position relative to the plates 54'.

The shifting of the said yoked arms 55 and 55' takes place prior to the operation of the totalizing crank 130 (Fig. 13), which has previously been described. When it is desired to print and indicate a total from the "grand" totalizer a key 307, which is supported by the right hand frame 40 of the machine (Fig. 1B), is given a slight movement inwardly by the operator. The key 307 being connected by a link 308 to a transverse rod 309 will cause the same to slide in its supports 310 toward the left.

Fast to the transverse rod 309 (Figs. 2 and 3) is a shifting arm 315 which is bifurcated at its upper end 316 to straddle a collar 317 fast upon the largest of the nested sleeves 306. A sliding of this collar will move all of the yoked arms 55 and 55' which will always retain their connections with the sleeves 178 (Fig. 1B) through a clutch 318 for each sleeve and thereby control the position of the total printer wheels and the total indicators when recording a total from the "grand" totalizer as well as from the "recording" totalizer.

Projecting from and near the top of the shifting arm 315 (Figs. 2 and 3) is a horizontal arm 319 which is bifurcated and embraces a sliding clutch member 320 on the "grand" totalizer turn back shaft 322. The normal position of the clutch member 320 (Fig. 3) is to the right in engagement with a companion clutch member 333 which is fast upon the "recording" totalizer turn back shaft 334.

The sliding of clutch member 320 being controlled by the action of the key 307 (Fig. 1B), when said key is pressed inwardly the "grand" totalizer shaft 322 (Fig. 3) will be connected to the "recording" totalizer shaft 334 and may be rotated to return to a home or zero position all the totalizer elements of the "grand" totalizer in the same manner as the "recording" totalizer at the proper time when the totalizing crank 130 (Fig. 13) is operated. The mechanism connecting the totalizing crank with the "recording" totalizer turn back shaft has hereinbefore been described.

It is obviously necessary to print the total appearing on the "recording" totalizer and reset the latter to zero before attempting to print from and reset the "grand" totalizer. Otherwise if an attempt be made to print from and reset the "grand" totalizer while an amount appears on the "recording" totalizer the amount on the latter will be lost without printing and indicating as it will be noted that the resetting movement of the shaft 322 of the "grand" totalizer is gotten by turning the resetting shaft 334 of the "recording" totalizer.

The operation of the character or symbol indicator 255 (Figs. 1B and 6) is controlled by the key 307, and when said key is in the forward position, as shown by the drawings, the indicator 255 will display both to the front and rear of the machine (when the flash 287 is in exposing position) a character which in this particular case is the letter "A" which denotes that a total has been recorded from the "recording" totalizer. When the key 307 is pressed inwardly to connect the "grand"

totalizer with the printing mechanism for the purpose of recording the grand total, the symbol indicator 255 will be rotated to bring into view a different character, which as the drawing shows is the letter "B". Connecting the symbol indicator 255 with the key 307 (Figs. 1B and 6) is an upright arm 335, a lever 337 and an indicator driving rod 343. The arm 335 is fast upon the end of key 307 and carries a pin 336 normally contacting the forward end of the lever 337 fulcrumed on the shaft 338 supported in the frame 40. The rear end of lever 337 has a formed ear 339 slotted for the entry of the rod 343 to raise and lower said rod to operate the symbol indicator 255. Attached to the extreme rear end of lever 337 to rock the same clockwise at the proper time is a spring 344.

The symbol indicator driving rod 343 which pivots upon a stud 345 in the indicator 255 (Fig. 6) has a projecting lug 346 which contacts the lower face of the ear 339, and by this connection with the lever 337 the aforesaid indicator is rotated from the "B" to the "A" position when the key 307 is in its outward position and the total printing crank is rotated.

The lower end of the driving rod 343 is shaped so as to engage with the oscillating bail 66 for the purpose of timing the rotating of the indicator 255 with the total printing crank.

When the key 307 is moved to its inward position, the lever 337 will swing counter-clockwise on its pivot 338 and compress the spring 347 between the ear 339 and the projections 348, which will place a tension on the rod 343. As the frame 66 is rocked clockwise the shoulder 349 of the rod 343 will be released so that said rod will rise to a point where the lug 346 will engage the ear 339 and the lower end 350 of the rod will be above the oscillating frame 66, and the indicator 255 will be held in moved position by the lever 337 and spring 347. The oscillating frame will then be returned to normal position and under the end 350 of the rod 343 and remain there until either an item key 30 or the totalizing crank 130 is again operated, regardless of the position of the key 307.

To retain the key 307 (Fig. 6) in both the "A" and "B" positions a collar 351 is fast upon said key and retains the key in either position by its engagement with a flat spring 352 fast to a cross bar 353.

*Operation*

The operation of the machine will be described briefly as follows:

Considering both the "grand" totalizer and the "recording" totalizer as having been reset to zero and the indicators 254 as being in their normal "0" positions and the indicator 255 in a position indicating "A" the operation comprising the different steps will be set forth so as to bring out clearly the cooperation of the several parts herein described.

Supposing the machine to be used in a retail store, the example of a purchase of several articles will be considered. After several items have been purchased the operator or clerk will depress the keys 30 singly or in combination, each operation of the keys 30 representing the price of one of the several items purchased by the customer. The operation of the keys 30 will enter the price of the items on both the "grand" totalizer and the "recording" totalizer and at the same time will print the items in a column on a detailed receipt as shown in Fig. 11. After the keys 30 have been operated for each of the items, a total printing crank 130 is then operated. The operation of the crank 130 will first act to operate the yoked arms 55' so as to bring the formed lips 56' into contact with the positioned steps of the scroll discs 54' of the "recording" totalizer. This adjustment of the yoked arms 55' will result in the adjustment of the printing wheels 203 to a position representing the total appearing on the "recording" totalizer. At the completion of the adjustment of the printing wheels 203 the platen carrier block 230 will be actuated by the cam race 244 to cause the platens 231, 232 and 233 to be effective to take an impression from the type wheels 203 and the type plates 234 and 235; the three impressions made by the platents 231, 232 and 233 being on the itemized receipt illustrated in Fig. 11. Simultaneously with the printing of the total from the type wheels 203 on the itemized receipt the total is also printed on a total strip which is retained in the machine, a portion of which is illustrated in Fig. 12. The total impression, it will be remembered, is obtained by the operation of the impression hammer 251 carrying the impression platen 253. Immediately following the taking of the two impressions from the type wheels 203 the operating connections are first effective to withdraw the yoked arms 55' from contact with the stepped plates 54' of the "recording" totalizer and the resetting connections are then effective for resetting the totalizing elements of the "recording" totalizer to zero.

At the same time that the yoked arms 55' are moved into engagement with the stepped disks 54' of the "recording" totalizer the indicators 254 are adjusted so that as the printing wheels 203 are moved to positions representing the total appearing on the "recording" totalizer the indicators will be caused to assume like positions so that the total of the items of the transaction will be publicly indicated both to the front and rear of the machine.

Toward the end of the operation of the total printing crank 130, feeding mechanism is effective to feed the detailed or itemized receipt 90 to a position where the said receipt may be torn from the strip of which it is a part. The feeding mechanism operated by the total printing crank 130 is effective to move the itemized receipt to an extent to bring the impression representing the total of the items just past the severing plate 97 mounted on the cabinet of the machine.

The machine is then in condition to receive the entry of further items and an additional transaction, a completion of the entry of items of each transaction being followed by an operation of the total printing crank 130 which results in the printing of the items on the "recording" totalizer, the indicating of that total, the resetting of the "recording" totalizer to zero, and the feeding of the itemized receipt bearing impressions representing the items of the transaction as well as the total of the transaction. The "grand" totalizer is allowed to continue the accumulation of items which at the end of the day will represent the grand total of all transactions appearing during the day.

The machine is so constructed that a total may be then printed from the "grand" totalizer by pressing in the key 307. This will shift the two sets of yoked arms 55 and 55' slightly to the left so as to bring the right hand arms 55' out of relation with the stepped plates 54' of the "recording" totalizer and at the same time will bring the left hand group of yoked arms 55 into operative relation with the stepped scroll plates 54 of the "grand" totalizer. At the same time the clutch member 320 of the resetting mechanism will be moved to the left so as to couple the resetting shaft of the "grand" totalizer to the "recording" totalizer resetting mechanism. The total printing crank 130 is then operated in a similar manner to that above described with regard to the "recording" totalizer. The total appearing on the "grand" totalizer will be printed and indicated, and the "grand" totalizer will be reset to zero.

Following the indication of a total by the indicators 254 this indication will remain exposed until a succeeding operation of one of the keys 30 when the bail 66, which is operated upon each actuation of the keys 30, will be rocked and through the connections with the latching pawls 278 for the indicators 254 will disengage said latching pawls from the locking teeth 280 carried by the segments 260 thus permitting the indicators 254 to be reset to normal zero positions through the action of the springs 273. At the same time the latching pawl 290 will be rendered ineffective so as to permit the flash 287 to move to concealing position under the action of the spring 288.

When the total printing crank 130 is operated it is desired simply to indicate the total which is taken from either of the totalizers, and consequently at such time it is not desired to have the indicators 64 in indicating positions. It will be remembered that the connection 193 to the arm 303 on the rocking bail 66 will be effective, when the total printing crank 130 is operated, to move the rocking bail 66 to a position releasing all of the indicators 64 which might then be standing in elevated positions so as to permit the same to drop under the action of their springs.

Figures 15, 16:
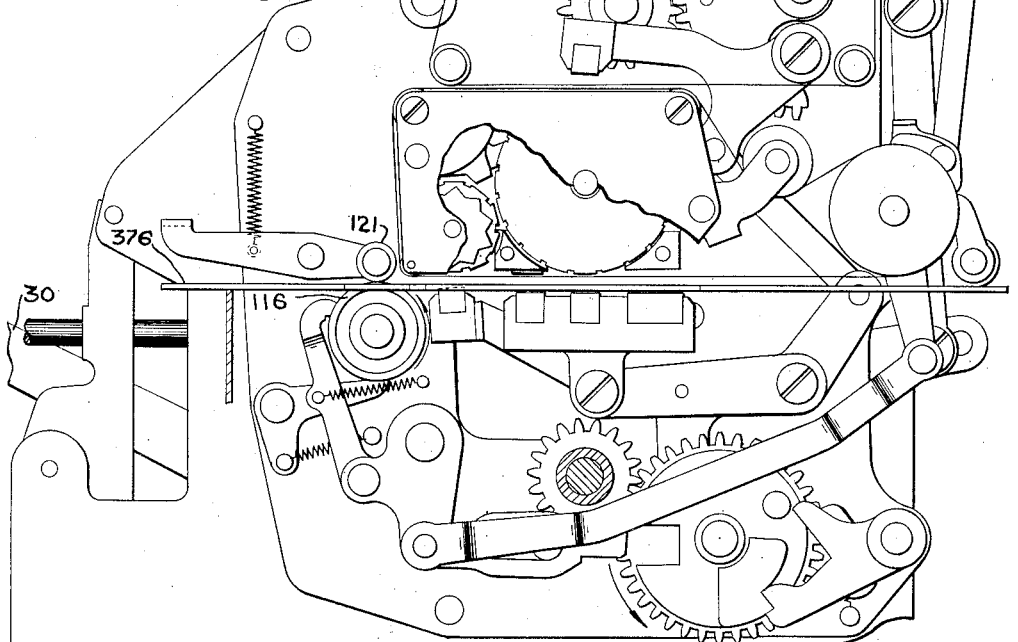
Fig. 15 is an elevation of a modified form of printing mechanism.
Fig. 16 represents an inserted slip printed by the printing mechanism shown in Fig. 15.

In the modified form shown in Fig. 15 the mechanism is substantially the same as that shown in Fig. 10. The sales slip 375 (Fig. 16) being substituted for the issuing receipt strip 90 (Fig. 11). Said sales slip 375 is placed upon the table 376 and between the feeding rollers 116 and 121 which feed the slip forwardly one space at each operation of the item key 30, each item being printed upon the slip. This slip is placed in the machine with the top edge toward the front of the machine. The word "Total" 377 and the amount 378 (Fig. 16) are printed in the same manner as in the regular form (Fig. 10) by an operation of the total printing crank 130.

In another modified form (Fig. 17) the items 379 and totals 380 (Fig. 18) are printed upon a continuous strip 381 (Figs. 17 and 18) which is fed from a supply roll 382 around guide rolls 383 on to a receiving roll 384. Any suitable form of feeding mechanism for the receiving roll may be provided. The printing mechanism beyond the above modification is substantially the same as used in the regular form, the total being printed in connection with the items on the strip 381 retained in the machine, the strip 172 of the form shown in Fig. 10 being dispensed with although it may be used if desired. If the strip 172 is not used all of its attendant mechanism may be omitted. When the strip 172 is used the supply roll for the strip 381 will be located in the position of the roll 91 in Fig. 10.

While the form of mechanism herein shown and described is admirably adapted to fulfill the objects primarily stated, it is to be understood that it is not intended to confine the invention to the forms or embodiments herein disclosed, for it is susceptible of embodiment in various other forms all coming within the scope of the claims which follow.

What is claimed is:—

1. In a machine of the class described, the combination of a totalizer, item entering means for entering items on said totalizer, indicators for indicating items entered in the totalizer, means for holding said indicators in the indicating position, an operating device for taking a total of said items from said totalizer, and means operable upon the actuation of said operating device for disabling said holding means.

2. In a machine of the class described, the combination of totalizers, totalizer actuators for entering items therein, total printing elements, and means normally disconnected from said totalizers and operable dissimultaneously with any movements of said totalizer actuators for adjusting said elements according to the amounts in the totalizers.

3. In a machine of the class described, the combination of a totalizer, a totalizer actuator for entering items therein, a total displaying element, and means normally disconnected from said totalizer and operable dissimultaneously with any movement of said totalizer actuator for adjusting said displaying element in accordance with the amount in the totalizer.

4. In a machine of the class described, the combination of a plurality of totalizers, totalizer actuators for entering items therein, total printing elements, a turn-to-zero device common to the totalizers, and means for adjusting said elements to print the amount in one of said totalizers and for resetting the totalizers to zero.

5. In a machine of the class described, means for printing totals of certain items, and a grand total of all the items; separate laterally spaced totalizers for simultaneously registering the items constituting the separate totals, and the grand total, and a single means under control of the operator for effecting printing of separate totals or a grand total as desired.

6. In a machine of the class described, the combination of a sub-total accumulator for accumulating the total of a series of items, a grand-total accumulator in axial alignment with the sub-total accumulator for simultaneously accumulating the grand-total of a plurality of such series, a key mechanism common to both of said accumulators for operating the same for effecting and controlling the accumulations thereon, total printing mechanism common to both of said accumulators for printing under the control of said accumulators, the amounts accumulated thereon and a single device for operating the common total printing mechanism.

7. In a machine of the class described, means for printing items, laterally spaced totalizers for simultaneously registering items constituting sub-totals, and the grand total, common means for printing separate totals of certain of said items, and a grand total of all the items, and a single key under control of the operator for controlling said common means to print separate totals or a grand total as desired.

8. In a registering machine, the combination of a set of subtotalizer elements, a set of grand totalizer elements, a set of graduated elements for each of said sets of totalizer elements and movable thereby, separate sets of contact means movable into engagement with said sets of graduated elements, type means adjusted by the contact means under control of said sets of graduated elements to positions corresponding to the amount standing on said totalizer elements, means for taking an impression from said type means; and common operating means adapted to impel said contact means against a selected one of said sets of graduated elements and adjust said type means to print the total standing on said selected set of totalizer elements.

9. In a registering machine, the combination of a set of subtotalizer elements, a set of grand totalizer elements, a set of graduated elements for each of said sets of totalizer elements and moved thereby, sets of contact means movable into engagement with said sets of graduated elements, a single set of type means adjusted by the contact means under control of said sets of graduated elements to positions corresponding to the amount standing on said sets of totalizer elements, and means for selecting a set of graduated elements and contact means for adjusting said type means.

10. In a machine of the class described, the combination of a plurality of laterally spaced totalizers, actuators therefor, differentially adjustable printer control means associated with each totalizer, and a printing mechanism common to both totalizers and printer control means and operable at the will of the operator to print the total accumulated on either of said totalizers.

11. In a machine of the class described, the combination of item entering mechanism, total printing mechanism, indicators adapted to be exposed to display totals as the totals are printed, means operated upon operation of the item entering mechanism for concealing indicators displayed during the preceding total printing operation, and means operated upon operation of the total printing mechanism for moving said concealing means to ineffective position.

12. In a machine of the class subscribed, the combination of a sub-total accumulator, a grand total accumulator, a set of feelers for each accumulator, printing devices including type carriers common to said two sets of feelers for printing the total from either accumulator and a single member operable to determine which set of feelers shall control the common type carriers.

13. In a machine of the class described, the combination of a plurality of totalizers; item-entering means; total printing elements; connections intermediate the totalizer and the total printing elements to cause said printing elements to move an extent commensurate with the amount on the selected one of the totalizers, said connections being inactive during item-entry operations; means to determine which of said totalizers shall control said connections; means, inactive during item-entry operations, to take an impression from the adjusted total printing elements; and a single operating means to render the connections and the impression taking means active.

14. In a machine of the class described, the combination of a totalizer; means for entering items therein; printing means for printing the items of a transaction and the totals thereof from the totalizer on an issuing receipt; and means, including an impression member operated by that portion of the printing means which prints the total upon the receipt; and means for making an additional printed entry of the total of the transaction from said printing means upon additional record material contained in the machine.

15. In a machine of the class described, the combination of a totalizer; means for entering items therein; printing elements; an operating device; connections rendered effective by the operating device and controlled by the totalizer for setting on certain of the printing elements the total appearing upon said totalizer; means whereby the items and totals will be printed upon a record material fed from the machine in the form of a receipt; and additional means operated by said operating device, whereby the totals will be printed by said certain printing elements upon an additional record retained within the machine.

16. In a machine of the class described, the combination of a totalizer; actuators for operating said totalizer; an operating device; indicating means for indicating the amounts as they are entered into the totalizer; additional indicating means operable upon an operation of the operating device for indicating the total of items appearing on said totalizer; means for maintaining said additional indicating means in indicating position between operations of the machine, and connections for disabling said maintaining means upon an actuation of said actuators.

17. In a machine of the class described, the combination of a totalizer; actuators for operating said totalizer; an operating device; indicating means for indicating the amounts as they are entered into the totalizers; means for holding said indicating means in indicating position between operations of the machine, additional indicating means operable upon an operation of the operating device for indicating the total appearing upon the totalizer; and connections for disabling said holding means upon an operation of said operating device.

18. In a machine of the class described, the combination of item entering means, a totalizer to receive the items and compute the total, means for printing the items as determined by the item entering means and the total as determined by the totalizer on an issuing record strip, means for feeding the strip a definite distance for each item printed, a severing edge whereby a portion of said strip may be removed from the main body of the strip, and means for feeding the strip a greater distance to move the printed total past the severing edge during the total printing operation.

19. In a machine of the class described, the combination of item entering means, a totalizer to receive the items and compute the total, means for printing the items as determined by the item entering means and the total under control of the totalizer on a record strip, feeding means therefor, means for actuating the feeding means to move the record strip a definite distance upon the printing of each item, severing means whereby a portion of said trip may be severed from the main body of the strip, and means for actuating the feeding means to feed the strip a greater distance to present the printed total to view at a point past the severing means during the total printing operation.

20. In a machine of the class described, the combination of item entering means, a totalizer to receive the items and compute the total thereof, means for printing the items as determined by the item entering means and the total under control of the totalizer on an issuing strip to form an itemized receipt, a severing edge against which the strip may be pressed to sever the same from the main section of the strip, means for feeding the strip a definite distance toward the severing edge for each item printed, and means for feeding the strip a greater distance upon the printing of the total to move the printed total past the severing edge.

21. In a machine of the class described, the combination of item entering means, a totalizer to receive the items and compute the total thereof, printing elements to print the items as determined by the item entering means and the total under control of the totalizer upon a recording strip, a tearing edge against which the strip may be pressed to sever the same from the main body of the strip to form an itemized receipt with total after the printing has been accomplished, and feed rolls intermediate the tearing edge and the printing mechanism adapted to be moved definite distances upon the printing of each of the items and a greater distance upon the printing of the total to move the printed total past the tearing edge prior to the severance of the receipt from the strip.

22. In a key operated cash register, the combination of a plurality of manually operable levers for driving totalizer actuators, a grand totalizer and a sub-totalizer driven thereby, a manipulative device for actuating the printing of sub-totals, and an additional manipulative device actuated in conjunction with the first manipulative device for governing the printing of a grand total of a plurality of sub-totals.

In testimony whereof I affix my signature.

EDWARD J. VON PEIN.